(12) United States Patent
Charhut et al.

(10) Patent No.: US 7,798,749 B2
(45) Date of Patent: Sep. 21, 2010

(54) HIGH-EFFICIENCY MATERIAL INLET WITH PARTICULATE DIFFUSER PLATE FOR USE IN ENTRAINING PARTICULATE SOLIDS IN A PRIME MOVER FLUID

(75) Inventors: Daniel E. Charhut, Lake Bluff, IL (US); Saurabh Rastogi, Green Oaks, IL (US); Stanley R. Tryba, Gurnee, IL (US); Robert T. Jones, Kiel, WI (US)

(73) Assignee: United Conveyor Corporation, Waukegan, IL (US)

( * ) Notice: Subject to any disclaimer, the term of this patent is extended or adjusted under 35 U.S.C. 154(b) by 7 days.

(21) Appl. No.: 12/228,556

(22) Filed: Aug. 14, 2008

(65) Prior Publication Data
US 2010/0040422 A1    Feb. 18, 2010

(51) Int. Cl.
*B65G 53/16*    (2006.01)
(52) U.S. Cl. .......................... 406/86; 406/122
(58) Field of Classification Search .................. 406/86, 406/92, 144, 122
See application file for complete search history.

(56) References Cited

U.S. PATENT DOCUMENTS

| | | | | |
|---|---|---|---|---|
| 477,692 | A * | 6/1892 | McConnell | 406/144 |
| 724,780 | A * | 4/1903 | Bassler | 406/144 |
| 1,189,328 | A * | 7/1916 | Williams | 406/48 |
| 1,310,815 | A * | 7/1919 | Weaver | 406/92 |
| 1,901,203 | A * | 3/1933 | Thompson | 222/224 |
| 2,586,705 | A * | 2/1952 | Palmer | 422/213 |
| 2,784,038 | A * | 3/1957 | Schneider | 406/122 |
| 3,115,278 | A * | 12/1963 | Mylting | 406/25 |
| 3,206,255 | A * | 9/1965 | Gray | 406/93 |
| 3,403,942 | A * | 10/1968 | Farnworth | 406/65 |
| 3,436,124 | A * | 4/1969 | Smith et al. | 406/75 |
| 3,809,438 | A * | 5/1974 | Hubbard | 406/106 |
| 4,049,405 | A * | 9/1977 | Goldsmith et al. | 55/479 |
| 4,114,954 | A * | 9/1978 | Pasieka et al. | 406/93 |
| 4,420,279 | A * | 12/1983 | Easley, Jr. | 406/14 |
| 4,569,161 | A * | 2/1986 | Shipman | 451/99 |
| 4,938,848 | A * | 7/1990 | Raines et al. | 205/392 |
| 5,018,910 | A * | 5/1991 | Weiss | 406/144 |
| 5,490,745 | A * | 2/1996 | Thiele et al. | 406/132 |
| 5,494,381 | A * | 2/1996 | Heyl et al. | 406/14 |
| 5,575,225 | A * | 11/1996 | Smith et al. | 111/174 |
| 5,775,237 | A * | 7/1998 | Reilly et al. | 110/234 |
| 5,899,641 | A * | 5/1999 | Pfeiffer | 406/144 |

(Continued)

*Primary Examiner*—Joe Dillon, Jr.
(74) *Attorney, Agent, or Firm*—Niro, Haller & Niro

(57) ABSTRACT

An improved pneumatic particulate conveyance system including a particulate diffuser plate is disclosed. The assembly includes a pipeline with one or more particulate inlets for introducing solid particulates to a prime mover, wherein the pipeline has at least one particulate diffuser plate located within the pipeline. The particulate diffuser plate has a length which runs parallel to the prime mover and occludes at least a portion of a particulate inlet so as to increase the surface area exposed to the conveying air, thus resulting in a more efficient momentum transfer to the particulate.

Figure 1:
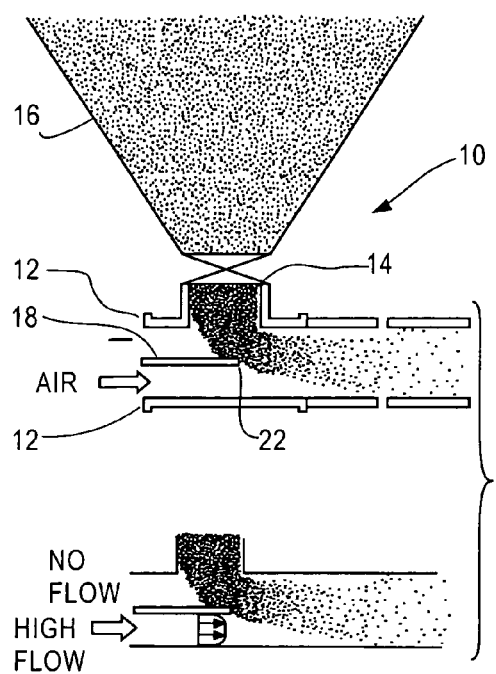

The plate used in the assembly further includes an arcuate trailing edge so as to encourage more particulate falling into the middle (i.e., the higher velocity portion of the profile) of the prime mover. In addition, depending upon the diameter and length of the pipeline, the assembly of the present invention may include a plurality of particulate diffuser plates so as to further increase the amount of exposed surface for momentum transfer to the particulate being conveyed.

4 Claims, 2 Drawing Sheets

U.S. PATENT DOCUMENTS

| | | | |
|---|---|---|---|
| 6,220,791 B1 * | 4/2001 | Hutchins | 406/124 |
| 6,821,060 B2 * | 11/2004 | McTurk et al. | 406/137 |
| 7,080,961 B1 * | 7/2006 | Blatt | 406/39 |
| 7,226,248 B2 * | 6/2007 | Hafner et al. | 406/146 |
| 7,270,249 B1 * | 9/2007 | Burkhead | 222/58 |
| 7,329,071 B2 * | 2/2008 | Sonnichsen | 406/89 |

* cited by examiner

HIGH-EFFICIENCY MATERIAL INLET WITH PARTICULATE DIFFUSER PLATE FOR USE IN ENTRAINING PARTICULATE SOLIDS IN A PRIME MOVER FLUID

FIELD OF INVENTION

The present invention relates to material inlets and related systems for the processing of particulate effluent. More specifically, the present invention relates to the use of a diffuser plate or similar device providing a more distributed contact profile to enable particulate solids to be more efficiently entrained by a fluid prime mover. A preferred embodiment of a system including the features of the claimed invention would include one or more diffuser plates or similar devices which are generally parallel to length of a pipe and the prime mover flow and perpendicular to a solids inlet, the plate(s) preferably having a semicircular or arcuate trailing edge (relative to the prime mover flow direction) which contacts a portion of a particulate solids flow from a inlet, thus providing a better distributed particulate which has better momentum transfer for transport by the fluid prime mover, thus reducing plugging and increasing conveying efficiency.

BACKGROUND OF THE INVENTION

The need to process and transport a wide variety of solid particulates has grown more pronounced with the increased awareness of the environmental impacts of various industrial processes. Bottom ash, fly ash, spent bed ash, economizer ash, oil ash, petroleum coke ash, and other particulates form widely varying materials, each of which create different challenges for removal and processing. Over the years, different types or classes of systems have been used for removal and transport depending upon the application involved, not limited to hydraulic, mechanical and pneumatic-systems. For a variety of specific applications, pneumatic conveying systems are desirable over other approaches because they have a lower initial cost,—a lesser amount of maintenance, and are more environmentally acceptable.

Heavy or coarse material may present unique problems for processing in such systems. In—pneumatic conveying systems, conveyed solids are dropped into a pipeline to be transferred by a fluid prime mover (e.g., air, nitrogen or other fluids). The prime mover transfers momentum to the conveyed solids, which cause the conveyed solids to be picked up and transported down the pipeline with the prime mover for subsequent storage and/or processing.

If the conveyed solids in question are heavy and/or coarse materials, there is a tendency for such solids to drop to the bottom of the pipeline before the prime mover can transfer enough momentum for the solids to be picked up. A subsequent pile of stationary solids then progressively builds below the solids inlet point. This buildup eventually causes the cross sectional area of the pipe around the solids inlet to decrease, which in turn causes an increase in the velocity of the prime mover around the top of the pile. Eventually, the increase in velocity over the top of the pile sufficiently increases such that any additional solids dropped into the pipeline receive enough momentum transfer from the prime mover. Clearing the pile of solids in situ may take significant time, as only the top surface of the solids is exposed to the prime mover flow, which means that the surface area of solids exposed for momentum transfer is limited. While material may eventually be picked up and conveyed (depending upon operating conditions) the inefficient momentum transfer and partial plugging of the pipeline reduces conveying efficiency. Many operating environments have little or no opportunity to clear the pipeline for such potential chokepoints manually. Indeed, the operations involved may require continuous or near continuous operation at maximum conveying efficiency. Thus, there is a need for a system and method for efficiently entraining a solid particulate in a prime mover fluid so as to avoid a buildup of solids particulate in a pipeline.

DESCRIPTION OF THE PRIOR ART

Figure 2:
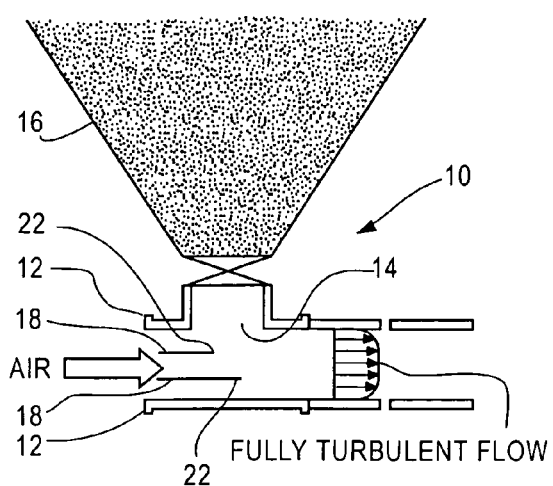
Figure 3:
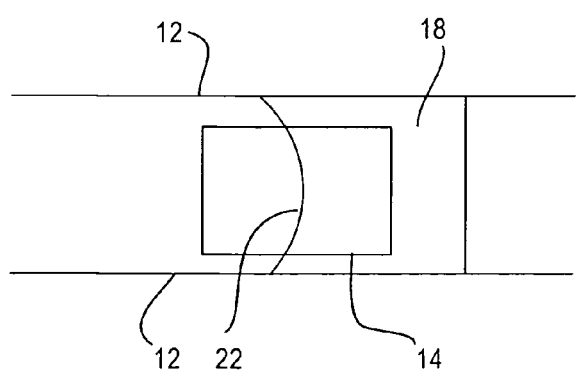
Figure 4:
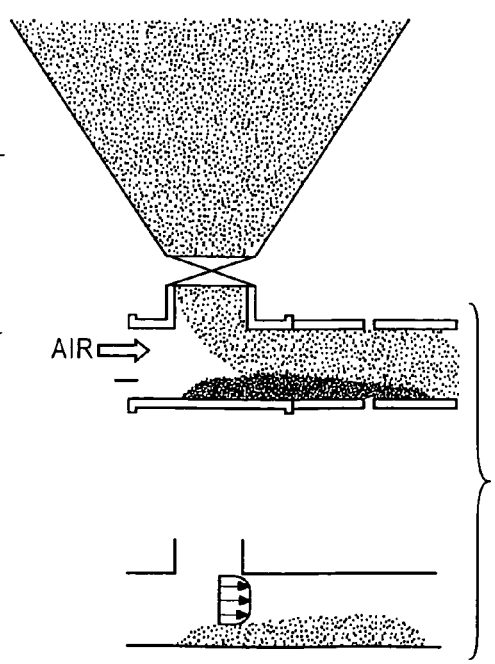
Figure 5A:
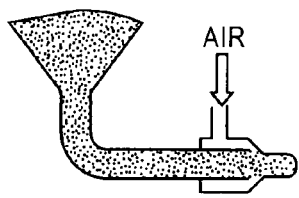
Figure 5B:
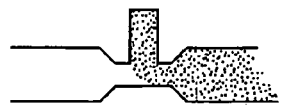
Figure 5C:
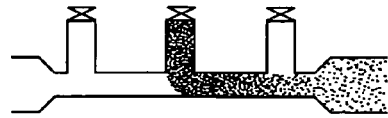

A variety of approaches have been tried previously with limited success, and with the creation of separate problems. One such approach is the use of a venturi tube—, whether an air venturi tube—(Prior Art FIG. 2a) or a mechanical venturi—tube (Prior Art FIG. 2b) or an improved or modified mechanical venture tube—(Prior Art FIG. 2c). Venturi tubes have been well known to those of skill in the art of particulate disposal and processing for years. Such tubes can also be used to mix a fluid with a particulate. If a pump forces the fluid through a tube connected to a system consisting of a venturi to increase the fluid speed (i.e., the diameter decreases), a short piece of tube with a small hole in it, and last a venturi that decreases speed (so the pipe gets wider again), air will be sucked in through the small hole because of changes in pressure. At the end of the system, in theory, a mixture of fluid and air will appear.

In practice, however, such approaches have limitations which, over time, limit the efficacy of the mixing process. In operation, such tubes may not be efficient in instances where the particulate to be conveyed includes coarse, heavy solids. These prior art approaches teach the use of more complex sensor and control systems which sense increase restriction in a pipeline (e.g., by sensing an increase in flow through the further restriction of the pipe) and restrict the feed of particulates from the inlet valve(s) to the pipeline until such time as the particulate has dislodged and flowed downstream to a subsequent collection and/or processing location. (See, e.g., U.S. Pat. No. 5,775,237).

Such prior art approaches offer an improved and controlled delivery of particulates for further disposal or processing, and may be used in combination with the present invention. However, such approaches fail to take steps to avoid the accumulation of particulate which can block a pipeline. Moreover, such systems fail to address operating conditions where the particulate may not readily displace through the variance in fluid flow rate alone.

Definition of Terms

The following terms are used in the claims of the patent as filed and are intended to have their broadest plain and ordinary meaning consistent with the requirements of law.

Fluid/Prime Mover: this refers to air, nitrogen or other fluids which may be used to transport solids.

Particulate Inlet: this generally refers to a valve or opening between a pipeline and a hopper, crusher or other equipment for storing or providing solid particulate.

Pipe/Pipeline: a typically cylindrical cross section continuous conduit which may include related equipment or sections such as valves, scrubbers, blowers, meters and the like, wherein the conduit facilitates transport of a particulate to location away from the particulate inlet for further storage and/or processing.

Where alternative meanings are possible, the broadest meaning is intended. All words used in the claims set forth below are intended to be used in the normal, customary usage of grammar and the English language.

OBJECTS AND SUMMARY OF THE INVENTION

The apparatus of the present invention generally comprises one or more diffuser plates for providing an increased surface area exposed to the prime mover and a resulting increase in suspended residence time and momentum transfer, thus reducing or eliminating particulate build up in the pipe. The diffuser plate is located in a direction parallel to the prime mover (i.e., so as to avoid any blockage of the pipeline due to the plate itself) while the face of the particulate diffuser plate is most preferably perpendicular to the particular inlet. In addition, the diffuser plate at least partially occludes the communication between the particulate inlet and the pipeline such that the diffuser plate acts as a mechanical stop for at least a portion of the particulate introduced from the particulate inlet to the prime mover. The degree of occlusion between the particulate inlet and the bottom of the pipe may vary between 30-100%, depending upon a variety of factors such as the length and diameter of the pipe involved.

In one preferred embodiment of the invention, the trailing edge of the particle diffuser plate may have an arcuate or semicircular profile so as to contact particulate passing along the edges of the pipe before such materials settle at the bottom of the pipe, thereby increasing particulate residence time in the highest section of the velocity profile of the prime mover.

As can be shown from the discussions above, an object of the present invention is to provide an increased surface area of particulate to prime mover so as to facilitate a more efficient momentum transfer.

A further object of the present invention is to provide a system and device with reduced blockage or plugging of a pipeline in the removal of solid particulate.

Still yet another object of the present invention is to provide an apparatus and process for shifting the residence time for material introduced into a prime mover to the highest portions of the prime mover velocity profile.

These and other objects, features, and advantages of the present invention will become more apparent in light of the following detailed description of a best mode embodiment thereof, and as illustrated in the accompanying drawings

BRIEF DESCRIPTION OF THE DRAWINGS

FIG. 1 shows an exposed side view of a particulate diffuser plate assembly embodiment of the present invention in operation.

FIG. 2 shows an exposed side view of a multiple diffuser plate assembly embodiment of the present invention.

FIG. 3 shows an exposed top view (i.e., from the perspective of the particulate inlet) of a diffuser plate with an arcuate trailing edge partially occluding the particulate inlet opening.

FIG. 4 shows a prior art drawing of pneumatic conveyor systems having particulate accumulation in the bottom of the pipe.

FIGS. 5*a*, 5*b*, and 5*c* show various prior art approaches for controlling fluid flow in the conveyance of solid particulate.

FIG. 6 shows a sample graph tracking the efficiency gain of the system capacity as a function of the average bulk density of the particulate being conveyed.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Referring now to FIG. 1, the particulate diffuser plate assembly 10 of the present invention is preferably comprised of a pipeline 12 having one or more particulate inlets 14 displaced along the length of pipe 12. The particulate inlet 14 most preferably comprises a valve, such as a rotary valve which can restrict or stop the flow of particulate therethrough, which is provided from a hopper 16 or other alternative sources such as a crusher (not shown). The assembly 10 further includes at least one particulate diffuser plate 18. The plate 18 is parallel to the flow of the prime mover (labeled as "AIR" in FIG. 1, which is provided by a motor or other suitable machine for generating a gaseous flow, not shown), and the plate 18 includes a leading edge 20 and a trailing edge 22. The trailing edge 22 is in the direction of the prime mover, and the portion of the plate nearest the trailing edge occludes or interposes between the particulate inlet 14 and the bottom of the pipe 12. The plate may be attached to the sides of the pipe 12 by any means known to those of skill in the art, including mechanical attachment, welding, integral molding, or integral casting, depending upon the system demands and choice of materials.

Referring now to FIG. 2, the assembly 10 may include multiple plates 18 if the diameter of the pipe 12 is sufficiently large. While a single plate 18 most preferably spans the horizontal diameter of the pipe (i.e., it is located at the middle between the top and bottom points of the pipe) multiple plates 18 may be displaced at various points between the bottom and top portions of the pipe 12. In one preferred embodiment, the trailing edge 22 of each plate 18 is displaced at different points along the length of the pipe 12, such that, for example, the top most plate 18 occludes the particulate inlet opening about 30%, while the bottom most plate occludes the opening 60%. Thus each plate 18 may impinge a portion of the particulate flow and increase the resulting surface area contacting the prime mover. In an alternative embodiment, each plate 18 may be located at the same length of the pipe 12, but each plate 18 includes one or more apertures (not shown) which permit a portions of the particulate to impact various of the plates 18 and increase the particulate residence time in higher sections of the prime mover velocity profile (i.e., further away from the boundary layers at the interior diameter of the pipe.

Referring now to FIG. 3, the trailing edge 22 of the plate 18 is shown partially occluding the particulate inlet 14. The degree of occlusion preferably employed in the assembly 10 of the present invention may range from 30-100% of the particulate inlet 14, depending upon the length and/or diameter of the pipe 12. In addition, in a preferred embodiment of the present invention, the lead edge 22 of the plate 18 will preferably comprise an arcuate or semicircular profile as shown so as to provide a more distributed contact profile, and to encourage the particulate flow into the middle (i.e., the higher velocity) of the prime mover flow.

Referring now to FIGS. 4 and 5 in comparison to FIG. 1 described above shows the impact of the diffuser plate assembly upon a solid particulate conveyance system. Specifically, the known approaches in pneumatic, negative pressure particulate conveyance systems frequently lead to the failure to entrain the particulates in the prime mover and a resulting build up or plugging of the pipe 12 which degrades the efficiency of the assembly 10. This limitation is particularly pronounced in pneumatic systems of the type claimed, as such systems commonly have a solids conveying capacity which may be lower than comparable mechanical systems.

Most preferably, the assembly 10 of the present invention is believed to have the best energy transfer with coarse, heavy particulate, though other types of solids may show improved momentum transfer (and thus capacity) as well. For example, it is believed that the increase in energy transfer efficiency will create up to a 50% increase in capacity for coarse (d50>75 u), heavy (>70 pcf) material. For finer (d50<75 u), lighter (40-70 pcf) material, the increase in energy transfer will be up to 5%.

Figure 6:
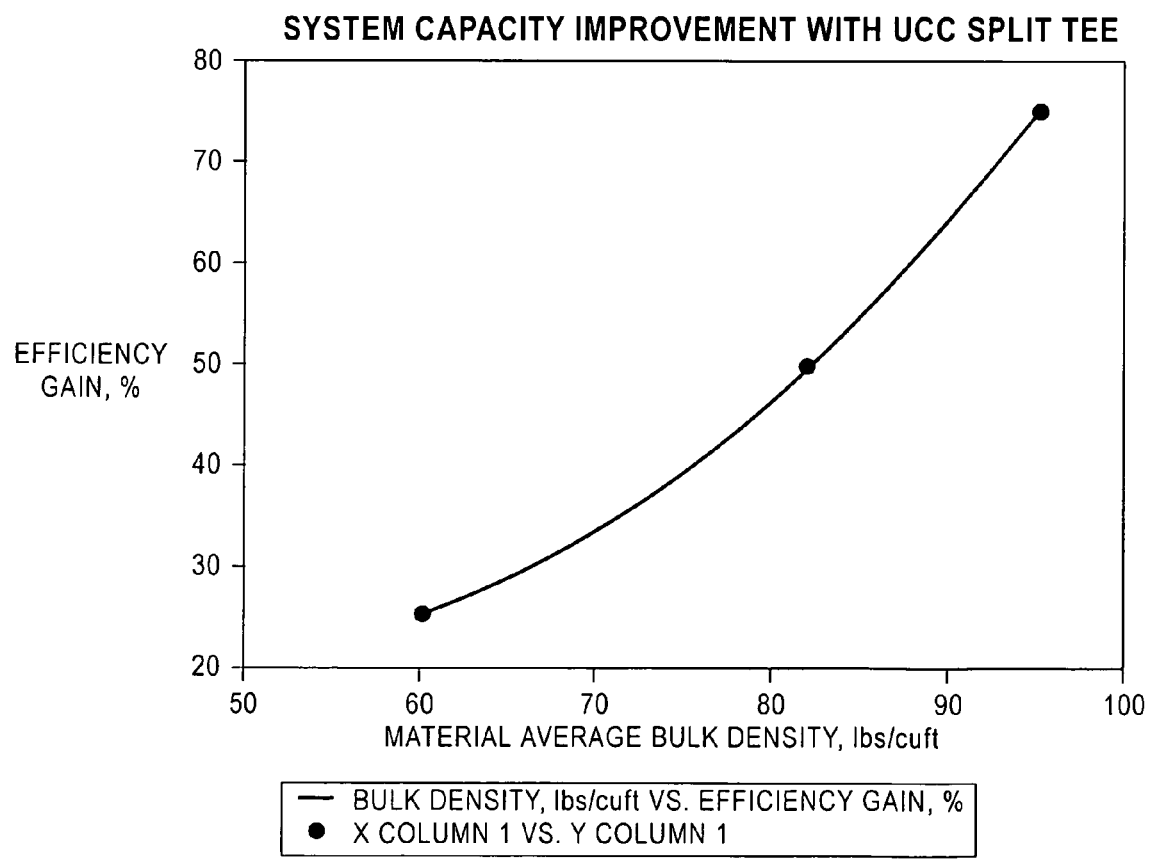

Efficiency improvements are expected to be variable, ranging from 10-25% for fly ash type materials (50-60 pounds/Cu. Ft. bulk densities) to 75% for coarse heavier materials such as bed ash (100 lbs./Cu. Ft.). FIG. 6 shows graph representing the expected efficiency improvements as a function of particulate densities. The high end improvement was documented at an experimental use of certain embodiments of the claimed invention at the Manitowac Public Utilities Station. System capacity in that instance improved from 8 tons per hour to 14 tons per hour with the installation of the new diffuser tees, without any change in the horsepower requirements for the system. The low end of the graph of FIG. 6 is predicted based upon rough numbers from a further field test confirming the applicability of the claimed invention to finer particulate.

Those of at least ordinary skill in the art of the present invention will understand that the diffuser plate of the present invention can be automatically adjusted in a further alternative embodiment by a control system or systems to optimize conveying efficiency (e.g., by adjusting the trailing edge of the plate so that the length of the plate is not substantially parallel to the fluid flow, or by having an adjustable plate angle to accommodate possible multidirectional fluid flows). Parameters such as diffuser plate vertical location, length, and angle of the plate with respect to the conveying fluid can all be independently varied to increase efficiency.

The above description is not intended to limit the meaning of the words used in the following claims that define the invention. Rather, it is contemplated that future modification in structure, function or result will exist that are not substantial changes and that all such insubstantial changes in what is claimed are intended to be covered by the claims. For instance, the selection of a particular number of vanes in the rotor assembly is for illustrative purposes with reference to the example drawings only. Likewise, it will be appreciated by those skilled in the art that various changes, additions, omissions, and modifications can be made to the illustrated embodiments without departing from the spirit of the present invention. All such modifications and changes are intended to be covered by the following claims.

We claim:

1. A high efficiency material inlet assembly for entraining particulate solids in a prime mover fluid flow path using a pneumatic system, said assembly comprising:
   a) a pneumatic system including a pipeline, said pipeline having a top surface and a bottom surface;
   b) at least one particulate inlet defined in a top surface of said pipeline for providing a gravitational flow of particulate into said pipeline; and
   c) a plurality of particulate diffuser plates disposed within said pipeline, each of said plates located in a different planes parallel to one another and said prime mover flow path and orthogonal to said gravitational flow of particulate, each of said particulate diffuser plates further defining an occluded portion of said particulate inlet and an open portion of said particulate inlet, such that said occluded portion is disposed vertically between said particulate inlet and said bottom surface such that at least a portion of the gravitational flow of said particulate will impinge upon each of said particulate diffuser plates;
   whereby said particulate diffuser plate increase the particulate residence time in the higher velocity portion of the prime mover flow, thus facilitating a greater momentum transfer to said particulate.

2. The assembly of claim 1, wherein each of said particulate diffuser plates has a trailing edge in operative communication with said particulate inlet, each of said trailing edges defining an arcuate profile.

3. The assembly of claim 1, wherein each trailing edge of said plurality of particulate diffuser plates is located at a different point along the length of said pipeline.

4. A high efficiency material inlet assembly for entraining coarse, heavy particulate solids in a prime mover fluid flow path using a pneumatic system, said assembly comprising:
   a) a pneumatic system including a pipeline, said pipeline having a top surface and a bottom surface;
   b) at least one particulate inlet defined in a top surface of said pipeline for providing a gravitational flow of particulate into said pipeline; and
   c) a plurality of particulate diffuser plates disposed within said pipeline, each of said plates located in a different plane parallel to one another and said prime mover flow path, each of said particulate diffuser plates further defining an occluded portion of said particulate inlet and an open portion of said particulate inlet, such that said occluded portion is disposed vertically between said particulate inlet and said bottom surface such that at least a portion of the gravitational flow of said particulate is to said particulate diffuser plates and will impinge upon each of said particulate diffuser plates, each of said particulate diffuser plates having a trailing edge in operative communication with said particulate inlet, each of said trailing edges defining an arcuate profile;
   whereby said particulate diffuser plate increase the particulate residence time in the higher velocity portion of the prime mover flow, thus facilitating a greater momentum transfer to said particulate.

* * * * *